United States Patent
Ashfaq

(10) Patent No.: US 11,867,861 B2
(45) Date of Patent: Jan. 9, 2024

(54) USING ELASTIC FACIES TO PERFORM QUALITY CONTROL OF WELL LOGS

(71) Applicant: Saudi Arabian Oil Company, Dhahran (SA)

(72) Inventor: Muhammad Ashfaq, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 456 days.

(21) Appl. No.: 16/809,095

(22) Filed: Mar. 4, 2020

(65) Prior Publication Data

US 2020/0284933 A1 Sep. 10, 2020

Related U.S. Application Data

(60) Provisional application No. 62/813,646, filed on Mar. 4, 2019.

(51) Int. Cl.
*G01V 1/50* (2006.01)
*G01V 1/28* (2006.01)
*E21B 41/00* (2006.01)
*G01V 13/00* (2006.01)
*G06F 18/2135* (2023.01)

(52) U.S. Cl.
CPC ............ *G01V 1/50* (2013.01); *E21B 41/0092* (2013.01); *G01V 1/282* (2013.01); *G01V 13/00* (2013.01); *G06F 18/2135* (2023.01); *G01V 2210/614* (2013.01); *G01V 2210/6169* (2013.01); *G01V 2210/63* (2013.01)

(58) Field of Classification Search
None
See application file for complete search history.

(56) References Cited

U.S. PATENT DOCUMENTS

| | | | | |
|---|---|---|---|---|
| 6,438,493 B1* | 8/2002 | West | ........................ | G01V 1/32 703/5 |
| 6,560,540 B2* | 5/2003 | West | ........................ | G01V 1/32 702/14 |
| 2015/0347898 A1* | 12/2015 | Hiu | ....................... | G01V 99/005 706/21 |

OTHER PUBLICATIONS

Alexsandro G. C., et al., Facies classification in well logs of the Namorado oilfield using Support Vector Machine algorithm; 15th International Congress of the Brazilian Geophysical Society (Year: 2017).*

Chopra S., Marfurt K., Seismic facies classification using some unsupervised machine learning methods, SEG Convention (Year: 2018).*

Saneifar M., Application of Conventional Well Logs for Rock Classification to Enhance Characterization of Heterogeneity in Carbonate, Dissertation (Year: 2015).*

(Continued)

*Primary Examiner* — Lina Cordero
(74) *Attorney, Agent, or Firm* — Fish & Richardson P.C.

(57) ABSTRACT

Methods and systems for performing log quality control on well data of non-key wells is provided. A method of identifying elastic facies in non-key wells as part of Log Quality Control (LQC) includes selecting one or more key wells, building a reference model of elastic facies using the well log data of the selected one or more key wells, propagating the reference model to well data of one or more non-key wells, benchmarking the well data of the non-key wells with the reference model, and calibrating the well data of the non-key wells with the reference model.

20 Claims, 17 Drawing Sheets

(56) References Cited

OTHER PUBLICATIONS

Dubois, M. K., Bohling, G.C. & Chakrabarti, S. (2007) Comparison of four approaches to a rock facies classification problem. Computers & Geosciences, vol. 33, 599-617 (Year: 2007).*

Akkurt, Ridvan, Conroy, Tim T., Psaila, David, Paxton, Andrea, Low, Jacob, and Paul Spaans. "Accelerating and Enhancing Petrophysical Analysis With Machine Learning: A Case Study of an Automated System for Well Log Outlier Detection and Reconstruction." Paper presented at the SPWLA (Year: 2018).*

Vinther, Rikke, Mosegaard, Klaus, Kierkegaard, Keld, Abatzis, Ioannis, Andersen, Claus, Vejbaek, Ole V., If, Flemming, and Peder H. Nielsen. "Seismic Texture Classification: A Computer-aided Approach to Stratigraphic Analysis." Paper presented at the 1995 SEG Annual Meeting, Houston, Texas, Oct. 1995.*

Ardakani et al., "Lithology discrimination using elastic rock properties and simulation seismic inversion in the ludic reservoir, NE Alberta," SEG Recorder, Jun. 2014, p. 42-46.

Ashfaq et al., "Accelerating log data preparation for seismic inversion mega projects—a unique workflow," Saudi Aramco, Mar. 2018, 22 pages.

Ashfaq et al., "Elastic facies prediction as a tool to quality control logs from clastic reservoirs in an offshore field of Saudi Arabia," Presented at the 13th Middle East Geosciences Conference and Exhibition, Manama, Bahrain, Mar. 5-8, 2018; GEO, 2018.

Cochrane, "Principles of Log calibration and Their Application to Log Accuracy," SPE 1323, Presented at teh SPE California Regional Meeting, Bakersfield, California, Nov. 4-5, 1965; Society of Petroleum Engineers, Jul. 1966, 10 pages.

Greder et al., "Petrophysical Logs on Cores: A New Tool for Core-Log Calibration and reservoir Characterization," Presented at the SPWLA 35th Annual Logging Symposium, Jun. 19-22, 1994, 24 pages.

Maffioletti et al., "Changing Scale and Domain of a Petrophysical and Elastic Properties Based Log-facies Classification," SEG Denver 2010 Annual Meeting; SEG, 2010, 5 pages.

Quijada et al., "Integration of well logs and seismic data for prediction of elastic properties in a heavy oil sand reservoir: Manitou Lake, Saskachewan," CSPG CSEG CWLS Convention, Calgary, Alberta, 2009; Frontiers + Innovation, 2009, 4 pages.

Schlanser et al., "Petro-Elastic Facies Classification in the Marcellus Shale by Applying Expectation Maximization to Measured Well Logs," SEG Denver 2014 Annual Meeting; SEG, 2014, 5 pages.

* cited by examiner

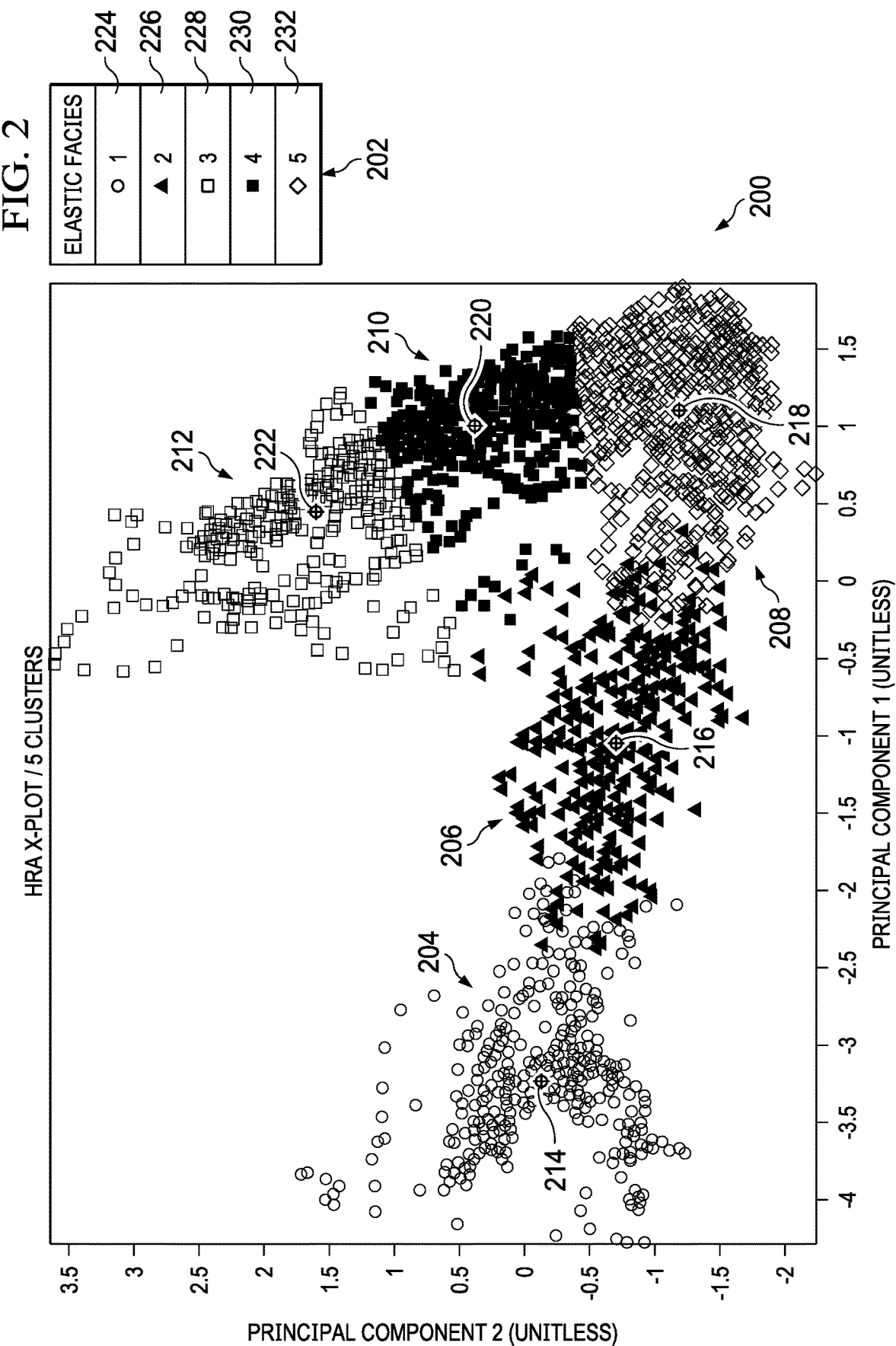

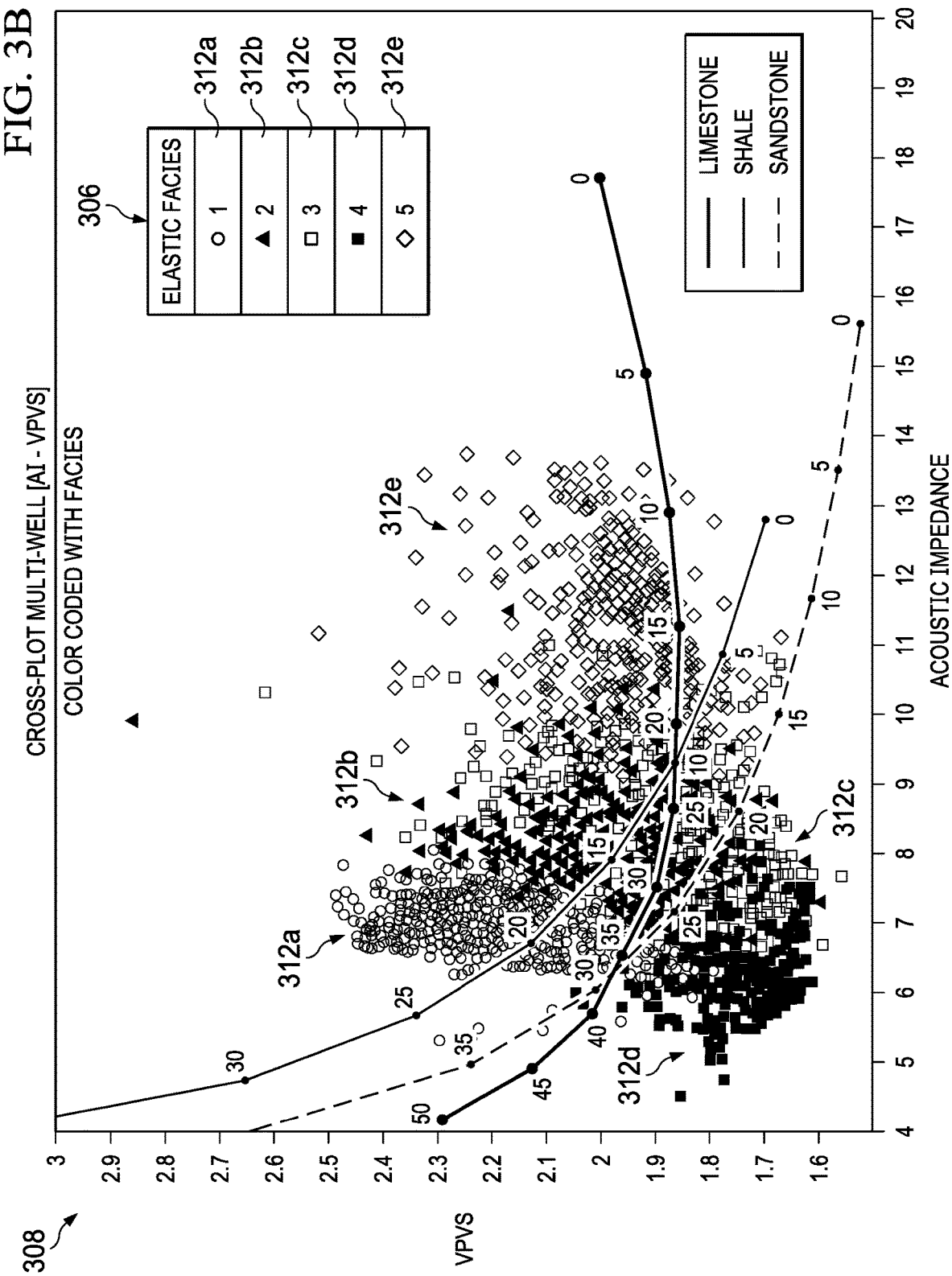

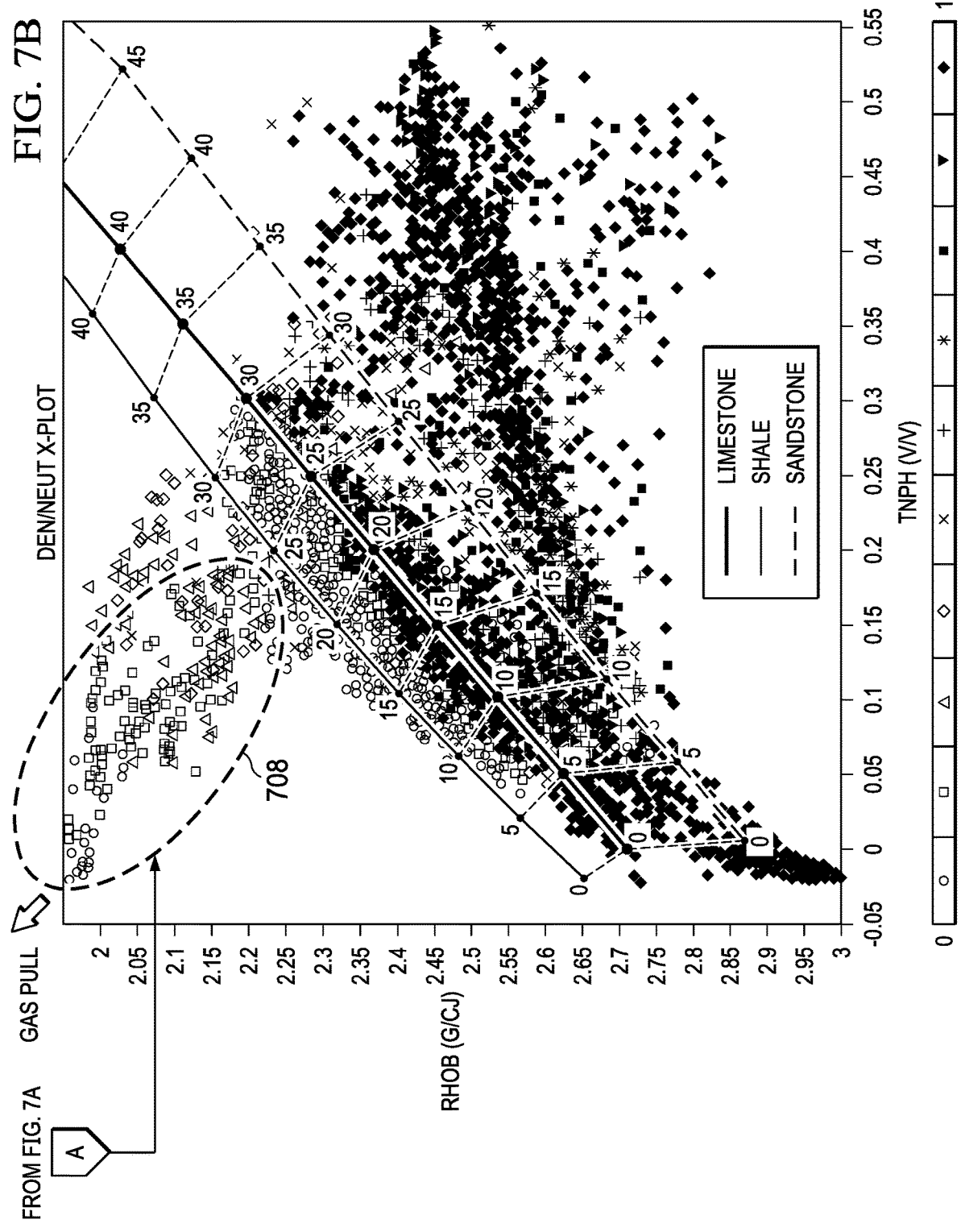

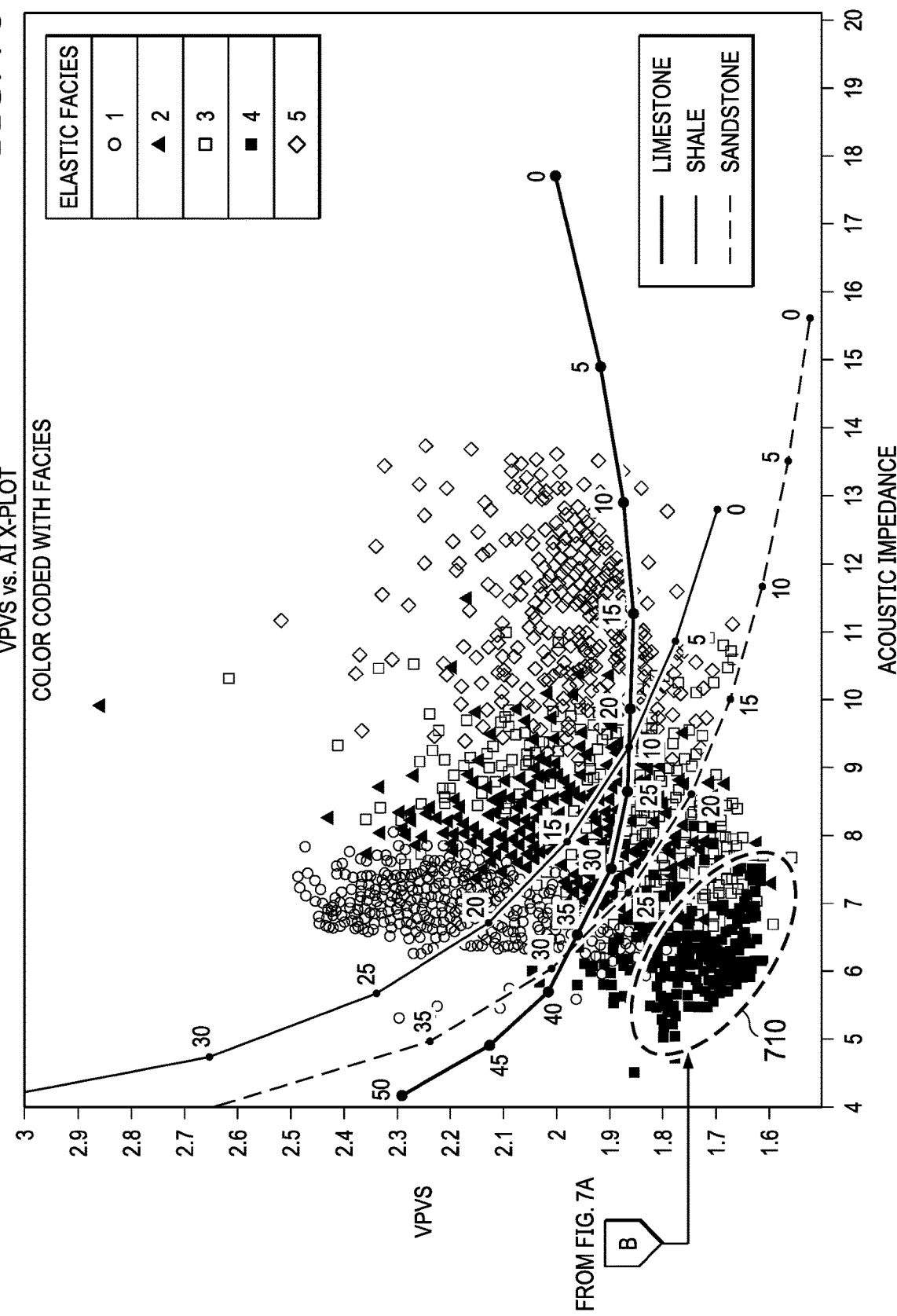

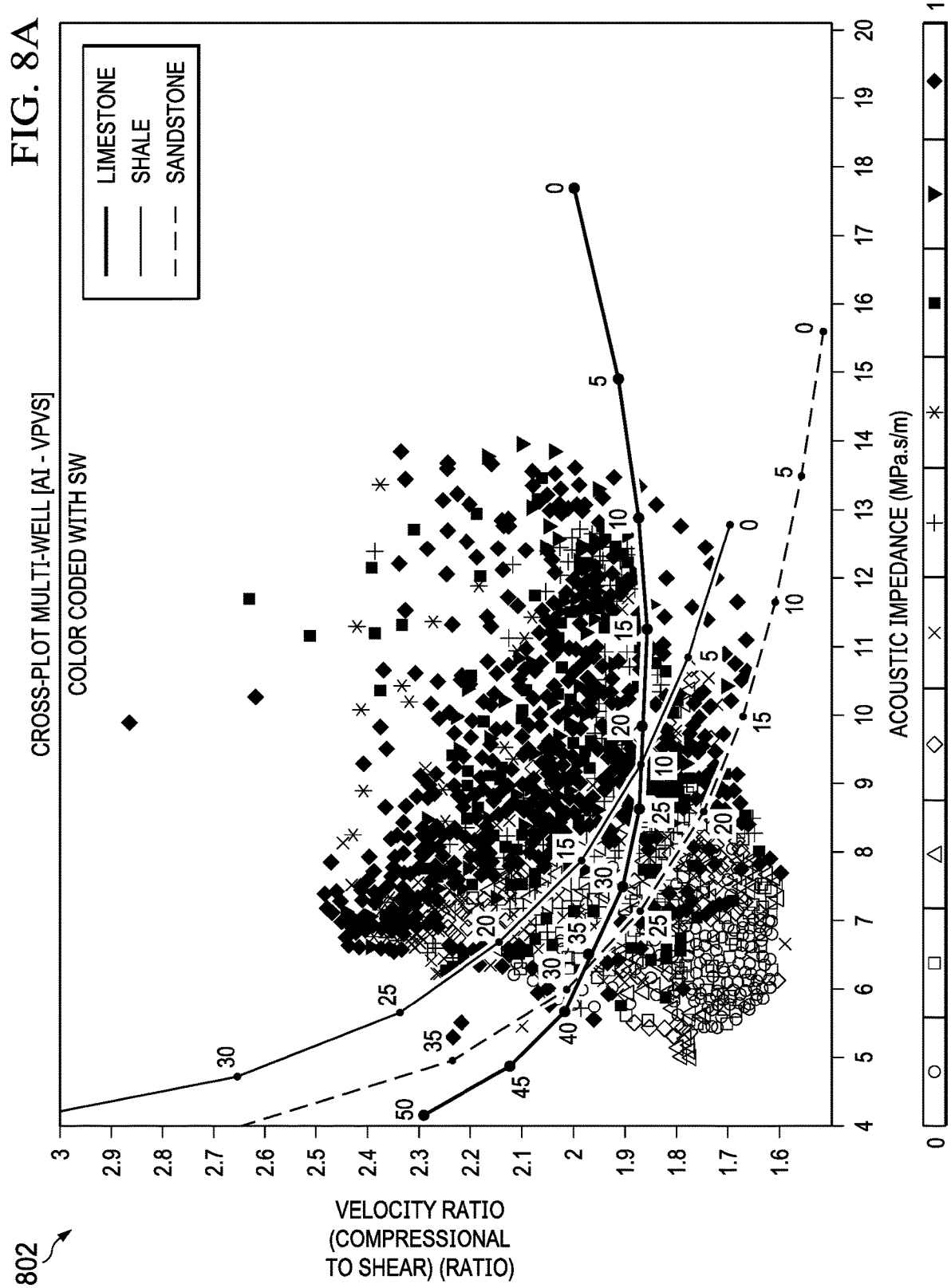

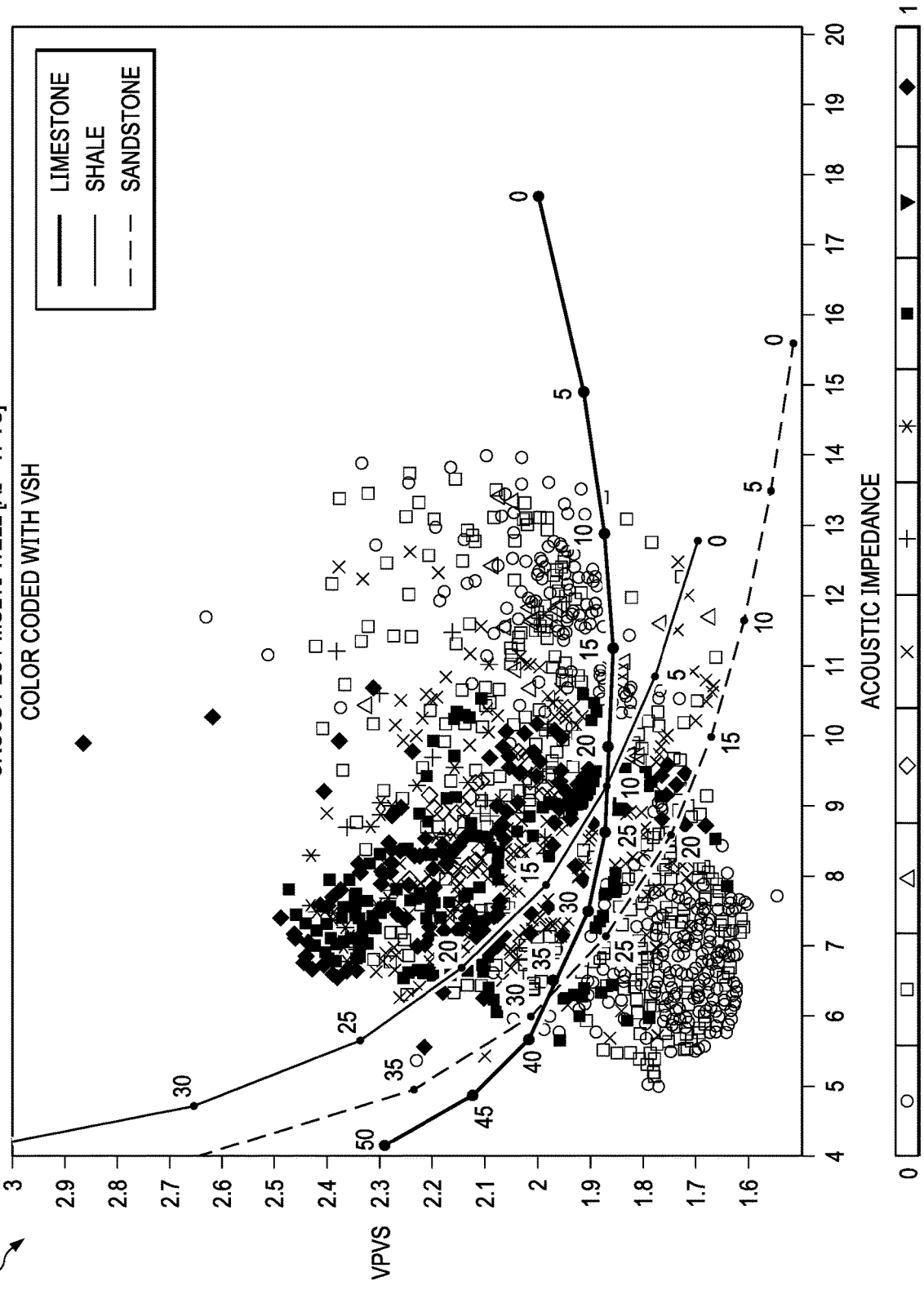

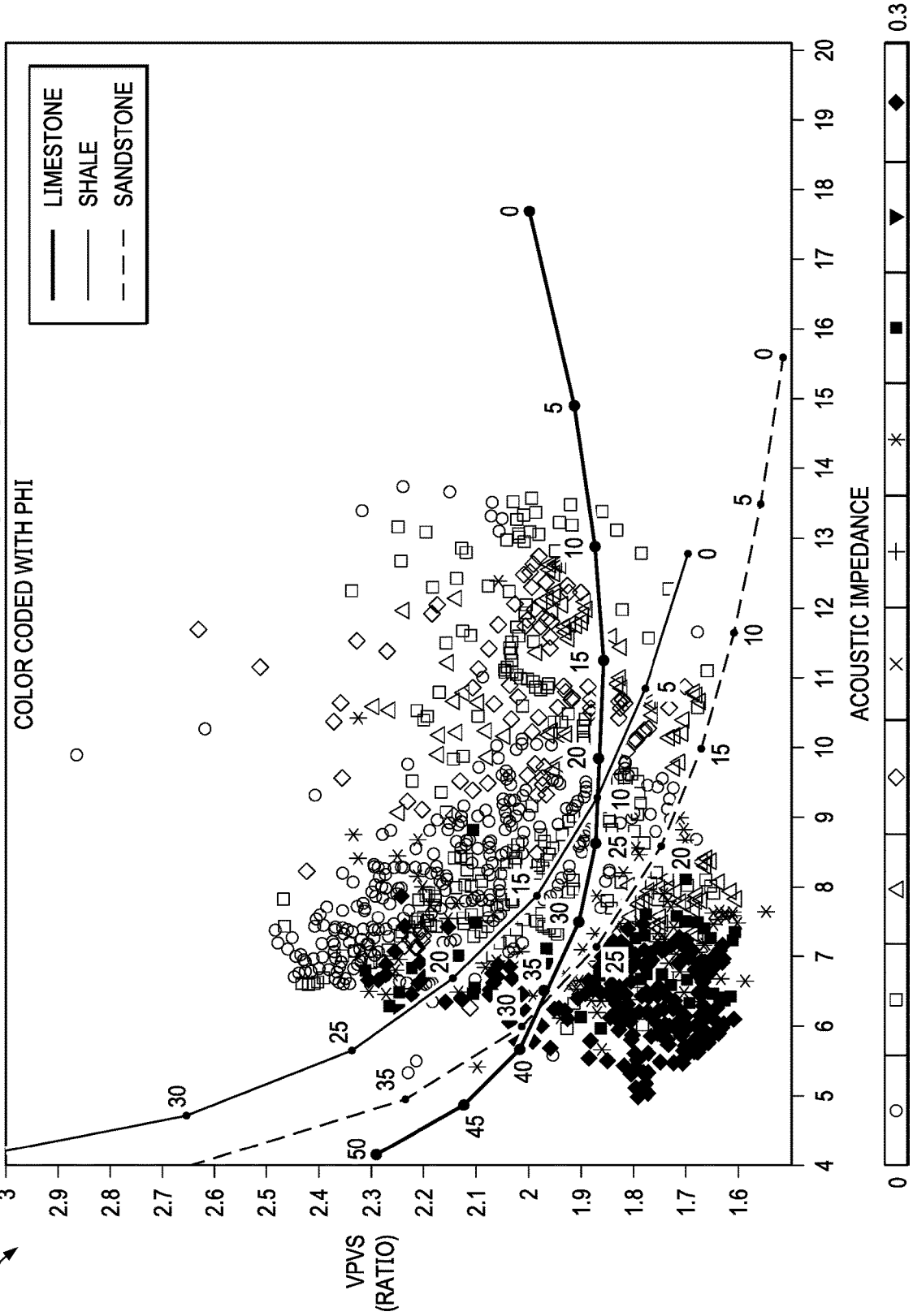

USING ELASTIC FACIES TO PERFORM QUALITY CONTROL OF WELL LOGS

CLAIM OF PRIORITY

This application claims priority under 35 U.S.C. § 119(e) to U.S. Patent Application Ser. No. 62/813,646, filed on Mar. 4, 2019, the entire contents of which are hereby incorporated by reference.

TECHNICAL FIELD

The present disclosure relates to performing quality control of well logs and, more particularly, to using elastic facies to perform quality control of well logs.

BACKGROUND

Performing a quality control analysis of well logs, referred to as Log Quality Control ("LQC"), is an important step for any rock physics study or seismic inversion study or both. Good quality log data ensures the success of any inversion study. The LQC becomes challenging when the log data associated with different wells are acquired in different ways or using different tool types or tools of different vintages, for example. When working with seismic data, a zone of interest along a depth of the earth is generally larger than a hydrocarbon producing zone or zones.

There are multiple challenges in an LQC process. For example, different tool types and vintages, log data acquired by different service companies, variability in logging suites, and different vertical well penetrations pose challenges to qualifying well logs. An LQC process becomes even more challenging when an area covered by a reservoir or reservoirs and an areal coverage representing lithological variations within the reservoir or reservoirs encompasses a large number of wells. For example, an LQC project may involve a project that encompasses hundreds or even thousands of wells. Consequently, such an LQC process may involve a sizable amount of log data. The preparation and analysis of such an amount of log data involves a vast amount of time and labor.

Conventionally, log calibration involves selecting zones of known lithologies having minimum fluid effects, such as thick anhydrite intervals or clean water bearing sand or limestone intervals, and using these zones to benchmark log readings for RHOB (Density), DT-P (P-Sonic), DT-S(Shear Sonic), GR (Gamma Ray), etc. These benchmark values are used to calibrate other wells in an area of interest.

SUMMARY

The proposed processes for using elastic facies to perform quality control of well logs is divided into two main parts. In the first part, the elastic facies are predicted from key wells using Heterogeneous Rock Analysis technique (HRA), which uses the Principal Component Analysis (PCA) to classify rocks. The key wells are selected based on the logging suite, the year of logging, a quality of log data, the reservoir coverage, and the areal coverage representing the lithological variations within the reservoirs. The predicted facies are calibrated using different petrophysical properties, well-by-well. Multi-well cross-plot techniques, such as Vp/Vs versus Acoustic Impedance color-coded by reservoirs properties, including water saturation, porosity and volume of shale, are utilized to identify the clean hydrocarbon-bearing sands within the wells. The reservoir intervals identified by these particular facies are then validated with formation test data from wells.

In the second part, the HRA facies are used as a discriminating tool to benchmark the log readings for the log validation process. The mean and the mode log values for the Gamma Ray, the Density, the Neutron Porosity, and the P- and S-Sonic are established for each facies. These benchmark values are then used as guides to calibrate and condition logs from nearby wells which are either logged with old tool vintages or the wireline data is severely affected by borehole washouts or gas kicks. This tool is also helpful to constrain the model to estimate shear and density logs over small missing intervals, although the proper rock physics model is used to predict missing shear wave and/or density data in the second phase.

The one or more embodiments of the present disclosure provide one or more of the following advantages. The processes described in this disclosure provide an accurate and consistent approach to LQC and condition logs across a given environment. This process reduces or eliminates a need of providing well marker data and a petrophysical analyses at a time of log data preparation phase and minimize the errors in the LQC process introduced by inconsistencies in the marker data. The proposed workflow accelerates and debottlenecks the LQC process for mega projects which involves thousands of wells with tight project deadlines In a general aspect, a process for identifying elastic facies in non-key wells as part of Log Quality Control (LQC) includes the actions of selecting one or more key wells. The actions include building a reference model of elastic facies using the well log data of the selected one or more key wells. The actions include propagating the reference model to well data of one or more non-key wells. The actions include benchmarking the well data of the non-key wells with the reference model. The actions include and calibrating the well data of the non-key wells with the reference model.

In some implementations, building the reference model includes performing a principal Component Analysis (PCA) on the well log data of the one or more key wells.

In some implementations, the one or more key wells are selected according to one or more of: a level of penetration of the well log data, a period of time in which the well log data is captured, a resolution of the well log data, a reservoir coverage of the well log data, and an areal coverage representing lithological variations within a well that is represented by the well log data.

In some implementations, building the reference model includes predicting elastic facies of a key well.

In some implementations, the actions include validating the predicted elastic facies using a plurality of cross-plots, each cross-plot including different elastic attributes from other cross-plots of the plurality.

In some implementations, each elastic facies is represented by a data cluster from a critical path analysis (CPA). The CPA is further configured to provide, for each elastic facies, a mean value of each input data type corresponding to that elastic facie to distinguish that elastic facie from other elastic facies. In some implementations, the actions include generating, in response to calibrating the well data of the non-key wells with the reference model, an alert when the well data of the non-key well is outside of a range of values indicated by the reference model.

In a general aspect, a system for identifying elastic facies in non-key wells as part of Log Quality Control (LQC) includes a memory for storing one or more instructions and one or more processing devices in communication with the memory and configured to execute the one or more instructions to perform operations. Generally, the operations include selecting one or more key wells. The operations include building a reference model of elastic facies using the well log data of the selected one or more key wells. The operations include propagating the reference model to well data of one or more non-key wells. The operations include benchmarking the well data of the non-key wells with the reference model. The operations include calibrating the well data of the non-key wells with the reference model.

In some implementations, building the reference model includes performing a principal Component Analysis (PCA) on the well log data of the one or more key wells.

In some implementations, the one or more key wells are selected according to one or more of: a level of penetration of the well log data, a period of time in which the well log data is captured, a resolution of the well log data, a reservoir coverage of the well log data, and an areal coverage representing lithological variations within a well that is represented by the well log data.

In some implementations, building the reference model includes predicting elastic facies of a key well.

In some implementations, the actions include validating the predicted elastic facies using a plurality of cross-plots, each cross-plot including different elastic attributes from other cross-plots of the plurality.

In some implementations, each elastic facies is represented by a data cluster from a critical path analysis (CPA). The CPA is further configured to provide, for each elastic facies, a mean value of each input data type corresponding to that elastic facie to distinguish that elastic facie from other elastic facies. In some implementations, the actions include generating, in response to calibrating the well data of the non-key wells with the reference model, an alert when the well data of the non-key well is outside of a range of values indicated by the reference model.

In a general aspect, one or more non-transitory computer readable media store instructions that are executable by one or more processors configured to perform operations for identifying elastic facies in non-key wells as part of Log Quality Control (LQC). Generally, the operations include selecting one or more key wells. Generally, the operations include building a reference model of elastic facies using the well log data of the selected one or more key wells. Generally, the operations include propagating the reference model to well data of one or more non-key wells. Generally, the operations include benchmarking the well data of the non-key wells with the reference model. Generally, the operations include calibrating the well data of the non-key wells with the reference model.

In some implementations, building the reference model includes performing a principal Component Analysis (PCA) on the well log data of the one or more key wells.

In some implementations, the one or more key wells are selected according to one or more of: a level of penetration of the well log data, a period of time in which the well log data is captured, a resolution of the well log data, a reservoir coverage of the well log data, and an areal coverage representing lithological variations within a well that is represented by the well log data.

In some implementations, building the reference model includes predicting elastic facies of a key well.

In some implementations, the actions include validating the predicted elastic facies using a plurality of cross-plots, each cross-plot including different elastic attributes from other cross-plots of the plurality.

In some implementations, each elastic facies is represented by a data cluster from a critical path analysis (CPA). The CPA is further configured to provide, for each elastic facies, a mean value of each input data type corresponding to that elastic facie to distinguish that elastic facie from other elastic facies. In some implementations, the actions include generating, in response to calibrating the well data of the non-key wells with the reference model, an alert when the well data of the non-key well is outside of a range of values indicated by the reference model.

The details of one or more embodiments of the present disclosure are set forth in the accompanying drawings and the description below. Other features, objects, and advantages of the present disclosure will be apparent from the description and drawings, and from the claims.

DESCRIPTION OF DRAWINGS

FIG. 2 is an example data cluster chart and associated key that are the result of the PCA analyses, according to some implementations of the present disclosure.

FIGS. 3A-3B show example charts that show well log data input into a Critical Path Analysis (CPA) and a continuous facies output from the CPA analysis, according to some implementations of the present disclosure.

FIGS. 7A-7C show final predicted facies for a key well in a study area, according to some implementations of the present disclosure.

FIGS. 8A-8D show Vp/Vs ratio versus AI cross-plots, according to some implementations of the present disclosure.

Like reference symbols in the various drawings indicate like elements.

DETAILED DESCRIPTION

Figure 1:
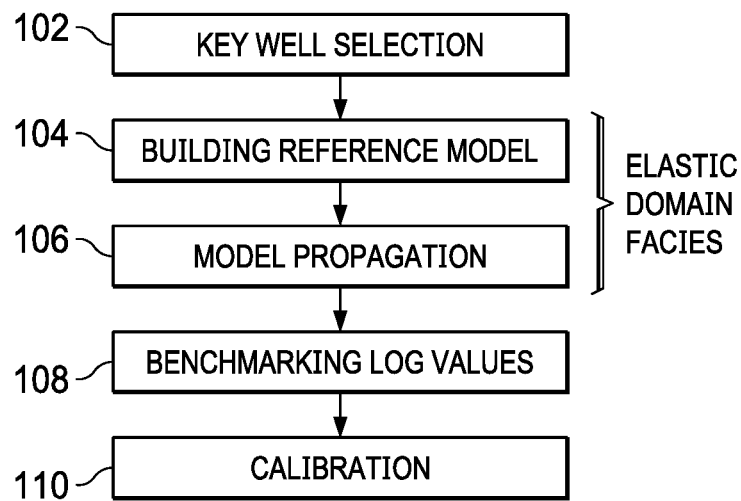
FIG. 1 is a flowchart of an example process, according to some implementations of the present disclosure.

For the purposes of promoting an understanding of the principles of the present disclosure, reference will now be made to the implementations illustrated in the drawings, and specific language will be used to describe the same. Nevertheless, no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, steps, or any combination thereof described with respect to one implementation may be combined with the features, components, and/or steps described with respect to other implementations of the present disclosure.

The present disclosure is directed to methods and systems for performing quality control on a set of log data using elastic facies. More particularly, the present disclosure is directed to using elastic facies data for selected or key wells to perform quality control on other wells within a zone of interest. This quality control process involves using the log data of the key wells to identify rock types in log data obtained from other non-key wells within the zone of interest. The present disclosure provides an automated process that provides for identifying rock types in non-key wells of a zone of interest using a shortened time period compared to the labor-intensive conventional approach and without the need for well markers or petrophysical analysis of the non-key wells.

Conventional approaches for performing quality control of log data for a plurality of wells involve drawbacks. For example, well marker data and the petrophysical analysis data are usually not available for all wells within an area of interest when Log Quality Control ("LQC") takes place. Well marker data can include data provided from well markers. Well markers can provide a data signature that is recognizable in the log data and which can provide assistance for determining the composition of the environment around and in the well. Moreover, in instances where well marker data are available, inconsistencies in the well marker data can lead errors in the LQC process. Conventional approaches also involve significant amounts of time, particularly when the LQC is associated with large or mega projects that involve hundreds or thousands of wells. Each of the well data associated with each of these wells needs to be reviewed. As a result, considerable amounts of time are needed, which is problematic due to time constraints. As a result, conventional approaches become a bottleneck.

The methods and systems described in the present disclosure provide an efficient, consistent, and, in some implementations, an automated approach that markedly reduces the time required to LQC well log data, particularly log data associated with large numbers of wells. Further, the methods and systems of the present disclosure do not require the existence of well marker data or petrophysical analysis of non-key wells, reducing the amount of data to be processed. In some implementations, the processing time for LQC can be reduced proportionally to a fraction representing the amount of well log data processed with respect to the total well log data of an environment. For example, if one of every two well logs for an environment are selected, the processing time for LQC can be reduced by half. This allows only the best log data in an environment to be selected. If more well data are selected, the accuracy of the predicted facies increases. Therefore, the systems and methods of the present disclosure accelerate the LQC process.

FIG. 1 is a flowchart of an example process 100 for accelerating an LQC process according to some implementations of the present disclosure. At step 102, key wells of a plurality of wells being analyzed, such as a plurality of wells disposed in a selected area or as part of a collection of related wells (such as a collection of wells in a project area), are selected. Key wells may be selected based on the quality of data associated with the well. For example, wells having accurate well data, may be selected to be key wells. Wells, such as cored wells and wells logged with latest tools, may be selected. Quality log data obtained by a quality logging suite and having log coverage with a desired level of penetration may be utilized in selecting key wells. For example, a quality logging suite can include resistivity logs, spontaneous potential (SP) logs, gamma ray (GR) logs, neutron logs, density logs, and sonic logs. The quality of a logging suite can be determined based on the coverage of the logging suite across one or more of these spectra and the resolution of each log of the suite. The key wells are used as a standard for determining facies which are applied to logging data of non-key wells in order to provide LQC.

At step 104, a reference model is constructed using the data associated with the key wells. The reference model may be created using elastic facies log data. Data, such as well log data, and other types of data associated with the key well may be used. Example data types include RHOB (density), DT-P (P-Sonic), DT-S(Shear Sonic), GR (Gamma Ray), lithology, and neutron porosity data. Selection of the data to be used is important, because the non-key wells should have associated data of the same types as those taken from the key wells and used to construct the reference model. Generally, RHOB, DT-P, DT-S, and GR data are collected during well logging. Therefore, in some implementations, these data may be used to build the reference model.

The selected well log data are used to predict the elastic facies or rock characteristics of the different subterranean rock types through which a well passes. The elastic facies are predicted using a statistical analysis. In some implementations, a Principal Component Analysis (PCA) technique may be used to determine the subterranean rock types using the key well data. Other types of data analysis may be used. For example, statistical approaches using fuzzy logic, neural networks, or multi-linear regression may also be used to predict the elastic facies. For the purposes of illustration only, PCA is described in the following description with the understanding that other types of statistical analysis may be used.

Data from each key well may be subjected to a separate PCA analysis. The selected log data are used as an input to the PCA analysis, and a data cluster chart is produced for each key well. Consequently, with each key well used as a separate analysis, a plurality of results are obtained to identify the facies and, ultimately, the subterranean rock types.

At step 106, the reference model is propagated to the non-key wells to determine the subterranean rock types indicated by the associated well log data. At step 108, well log data associated with the non-key wells is benchmarked, and, at 110, the non-key well data is calibrated. That is, at step 110, a determination is made as to whether log data associated with the non-key wells compares favorably or unfavorably with the reference model. A favorable determination exists where the non-key well log data fall within a range of values used to identify a particular type of rock. The data compares unfavorably when there is no such correspondence between the non-key well data and the reference model.

FIG. 2 is an example data cluster chart 200 and associated key 202 that are the result of the PCA analyses. As shown, the data cluster chart 200 contains five clusters of data, 204, 206, 208, 210, and 212. As is shown in FIG. 2, the clusters are separate from one another with little or any overlap. The PCA analyses also determine mean values 214, 216, 218, 220, and 222 for each of the clusters 204, 206, 208, 210, and 212, respectively. These different clusters represent different rock types contained in separate resolvable zones. While some overlap between data clusters may occur, as shown in FIG. 2, the mean values for each cluster is distinct from the means values of the other clusters. With distinct mean values and with separate clusters having little or no overlap, the resulting reference model is a satisfactory model.

The key 202 indicates five elastic facies 224, 226, 228, 230, and 232, each color-coded with the clusters identified in chart 200. Thus, the elastic facies 224, 226, 228, 230, and 232 correspond to the clusters 204, 206, 208, 210, and 212, respectively. Each of these elastic facies and, hence, each of these clusters represents a different rock type. Once optimum results are obtained via the PCA analyses, the final facies are verified using multiple cross-plots with different elastic attributes in order to verify that the predicted facies comport with regional geological framework.

In some implementations, obtaining results that define different clusters may be an iterative process. For example, the quality of the input data directly affect the quality of the PCA results. Additionally, the number of expected rock types may also affect the output of the PCA analysis. While the chart 200 shows five separate clusters, other analyses may resolve fewer or additional clusters.

As explained earlier, the Critical Path Analysis (CPA) identifies a number of resolvable data clusters. Each cluster represents a particular elastic facie and, thus, a particular rock type. The CPA also identified a mean value for each data type of the input data associated with a particular elastic facie. Thus, for each elastic facie predicted by the CPA, a mean value of each input data type corresponding to the elastic facie is also determined. In some implementations, a range of values for each mean value may also be identified. That is, for a particular mean value, an associated upper limit and lower limit may also be identified. The upper and lower limits define intervals for each data type for a particular predicted elastic facie. Thus, a predicted elastic facie has a combination of particular values of the input data that distinguish this particular elastic facie from the others.

Figure 3A:
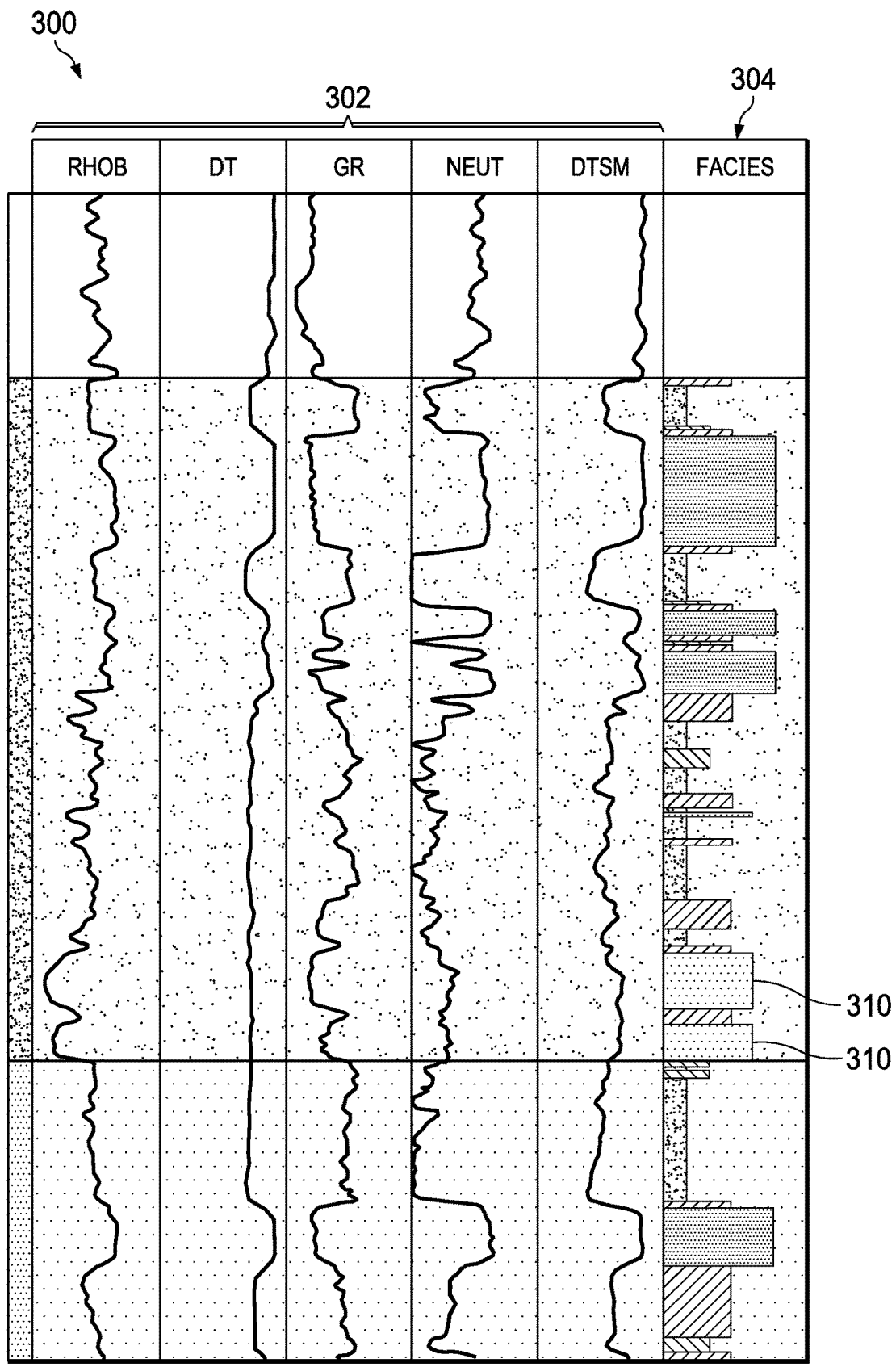

FIGS. 3A-3B include an example chart 300 that shows well log data 302 input into a CPA and a continuous facies output 304 from the CPA and a cross-plot 308. In this particular example, five data types are used as input data for the CPA. Particularly, RHOB, DT, GR, neutron (NEUT), and delta-time shear wave velocity (DTSM) data are used. As mentioned above more, fewer, or different data types may be used. The elastic facies output 304 identify different rock types 312a-e encountered during well logging and predicted as a result of the CPA. Again, these different rock types 312a-e are reflected in the key 306. These rock types 312a-e are verified with the use of cross-plots, such as cross-plot 308. Different cross-plots may be obtained with each different CPA. The example cross-plot 308 is a primary wave velocity and secondary wave velocity ratio (Vp/Vs ratio) versus acoustic impedance (AI) plot. Other types of cross-plots may be used to verify the rock types represented by the CPA output.

In addition to identifying the different subterranean rock types encountered, this process also includes the added benefit of identifying hydrocarbon reservoirs or sweet spots 310. These areas are detected as areas of reduced density as a result of the presence of hydrocarbons.

With the elastic facies and, hence, rock types verified, each elastic facie is assigned a value having a selected upper and lower range of values. The value assigned to each of the elastic facies, and, thus, rock types, is the mean value determined by the CPA for each elastic facie. A range of values around this mean value is also selected. Thus, the mean value is given an upper range and a lower range. During comparison with the log data of the non-key wells, if the each of the data values fall within the respective ranges for each of the data types, then a rock type is identified using the reference model.

The reference model is propagated to the non-key well data, as shown at 106. By propagating the reference model to the non-key well data, the elastic facies and, hence, rock types associated with the well log data are quickly identified or marked as needing additional review. As mentioned above, each elastic facie has associated numeric intervals for each data type used to generate the reference model. The reference model is propagated or applied to the log data of the non-key wells.

Once propagated, the log data of the non-key wells is compared to the determined data intervals associated with a particular elastic facie to the well log data associated with a non-key well, which represents benchmarking, which corresponds to 108 explained above with respect to FIG. 1. If the well log data of a non-key well falls within the determined intervals for a particular point of measurement, then a rock type is identified. If there is no match with any of the elastic facies contained in the reference model, then a notation may be made that no match exists and that these particular data may need to be revisited. As mentioned earlier, the non-key wells should at least have the well log data types used to generate the reference model. For example, where RHOB, DT-C, DT-S, and GR data were used to generate the reference model, each of the non-key wells should have at least this data in order for a comparison to occur. A "badhole" flag, that is, a differential caliper (DCAL), or bulk density correction (DRHO) may be used to flag washouts zones and to exclude such intervals during benchmarking. Identifying or not identifying correspondence between the elastic facies intervals with the non-key well data during benchmarking represents a calibration, as described earlier in 110 of FIG. 1.

Figure 4A:
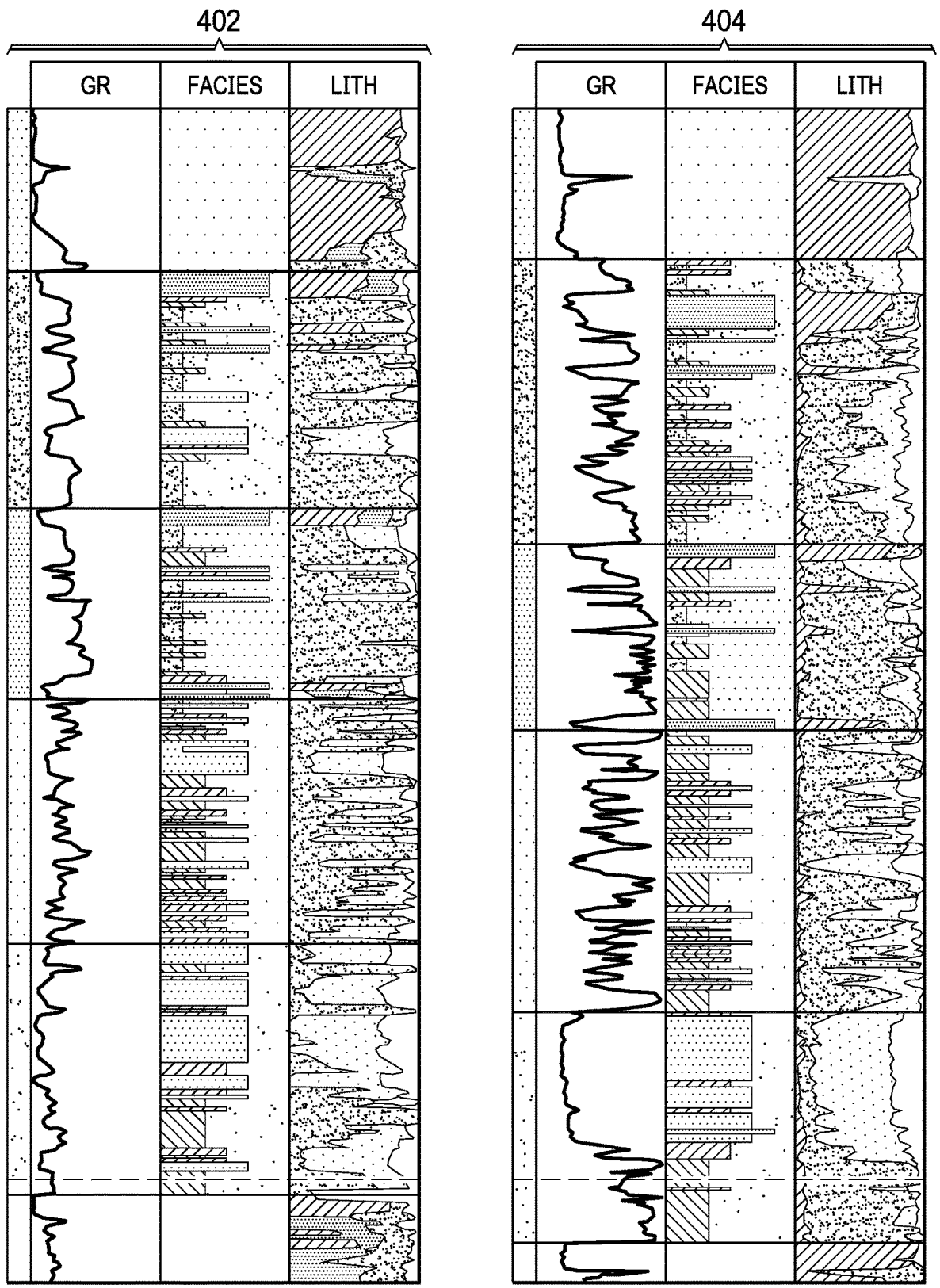
FIGS. 4A-4B show facies comparisons with petrophysical analyses for non-key wells, according to some implementations of the present disclosure.
Figure 4B:
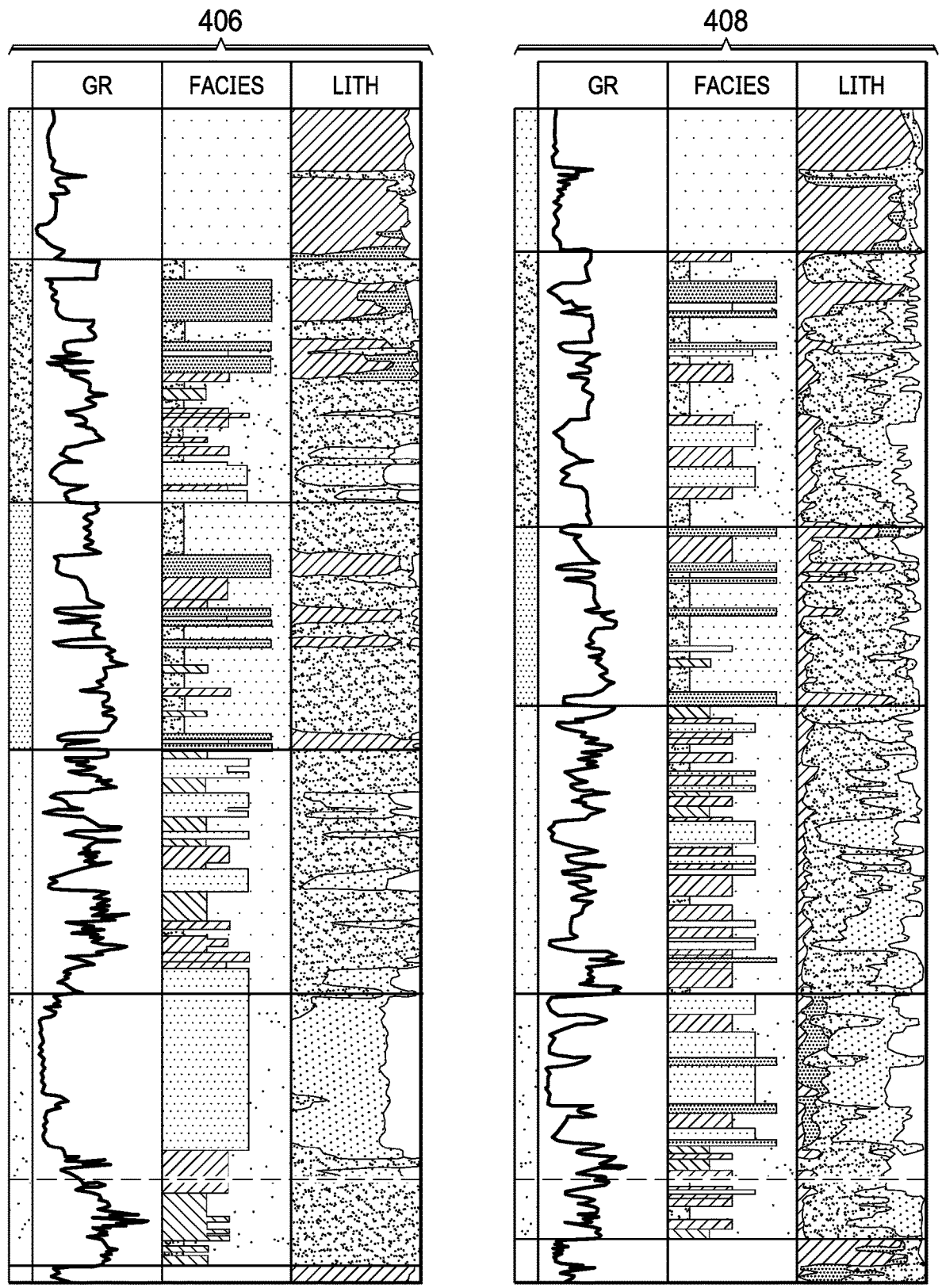

FIGS. 4A-4B show a facies comparison with petrophysical analyses for non-key wells. FIGS. 4A-4B show propagation of the reference model to the non-key wells, as previously described in relation to FIG. 1. The reference model is propagated to non-key wells 402, 404, 406, and 408 to predict the facies for the non-key wells. The non-key wells 402, 404, 406, 408 should include at least the minimum set of logs required to run the model. In some implementations, a badhole flag e.g., DCAL (differential caliper) or DRHO (bulk density correction) is used to flag the washouts zones to exclude these intervals during the benchmarking log readings stage.

Figure 5A:
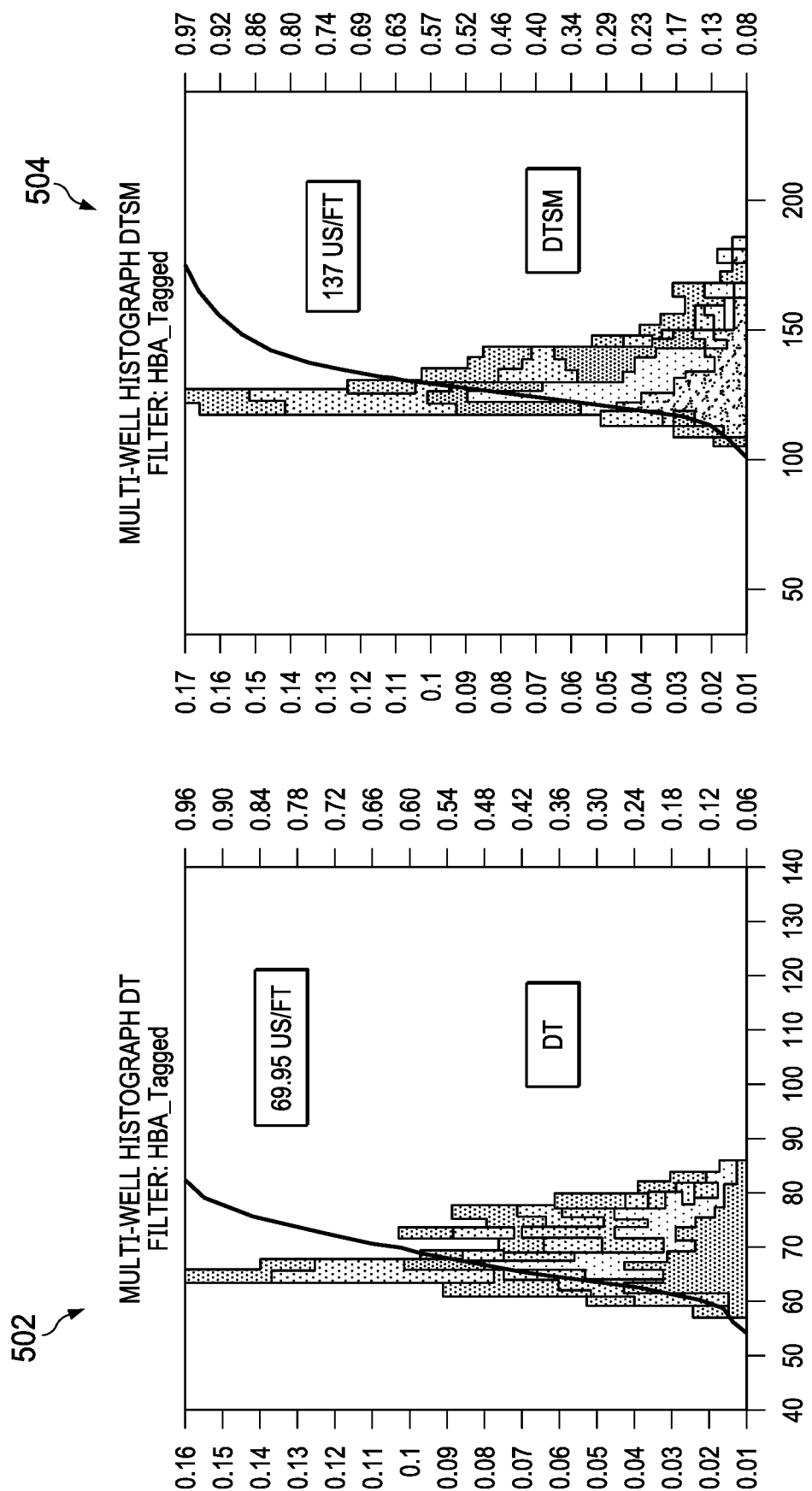
FIGS. 5A-5B show a series of histograms for selected key wells for data types DT-P, DTSM, GR, and RHOB, respectively, according to some implementations of the present disclosure.
Figure 5B:
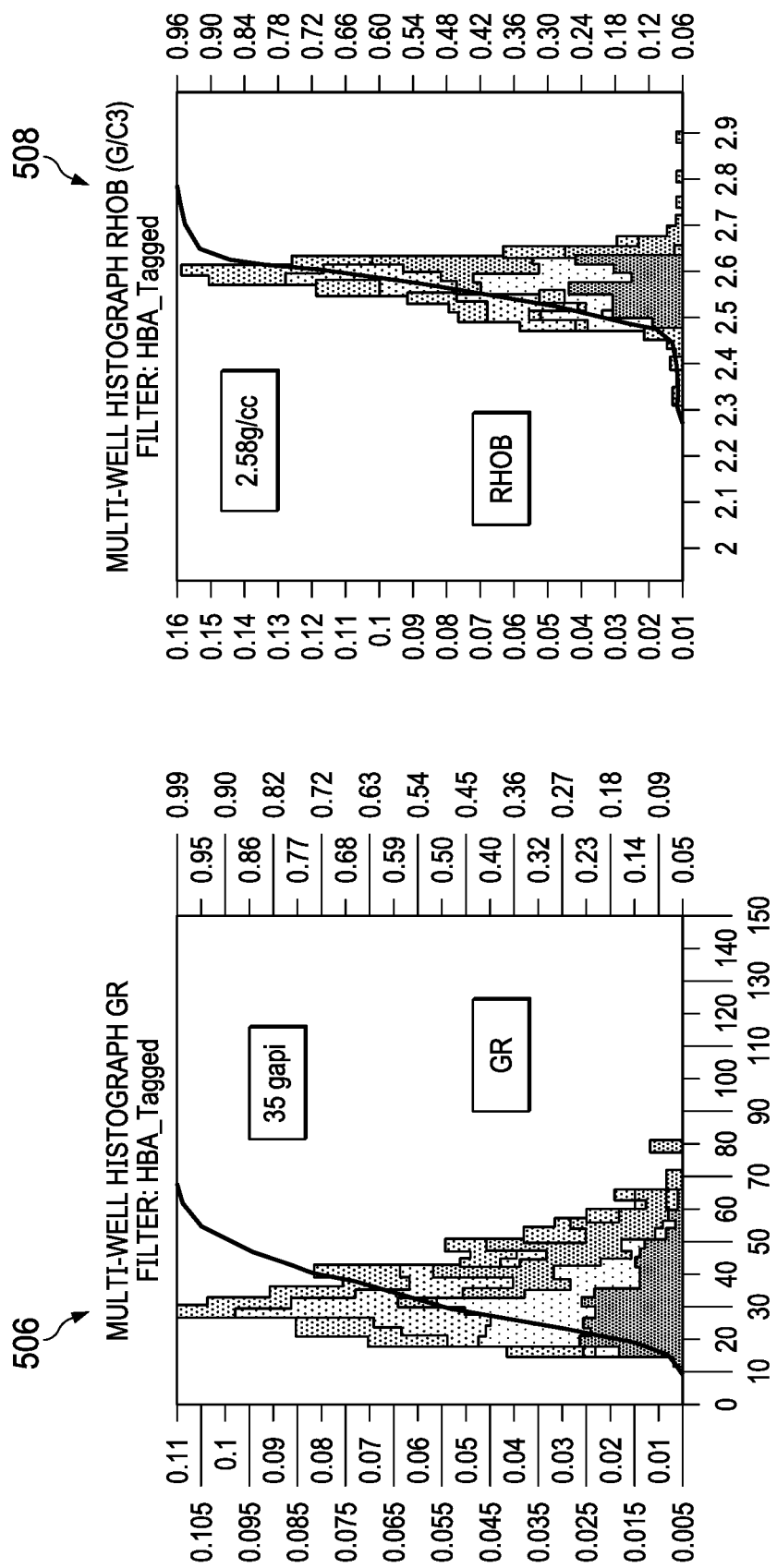

FIGS. 5A-5B show a series of histograms for selected key wells for data types DT-P 502, DTSM 504, GR 506, and RHOB 508, respectively. As shown in FIG. 5, the mean value for DT-P 502 is 69.95 μs/ft.; the mean value for DTSM is 137 μs/ft.; the mean value for GR is 35 gapi; and the mean value for RHOB is 2.58 g/cc. As explained above, with the use of the key well data, a mean value and interval for each data type corresponding for a particular elastic facie is generated.

Figure 6:
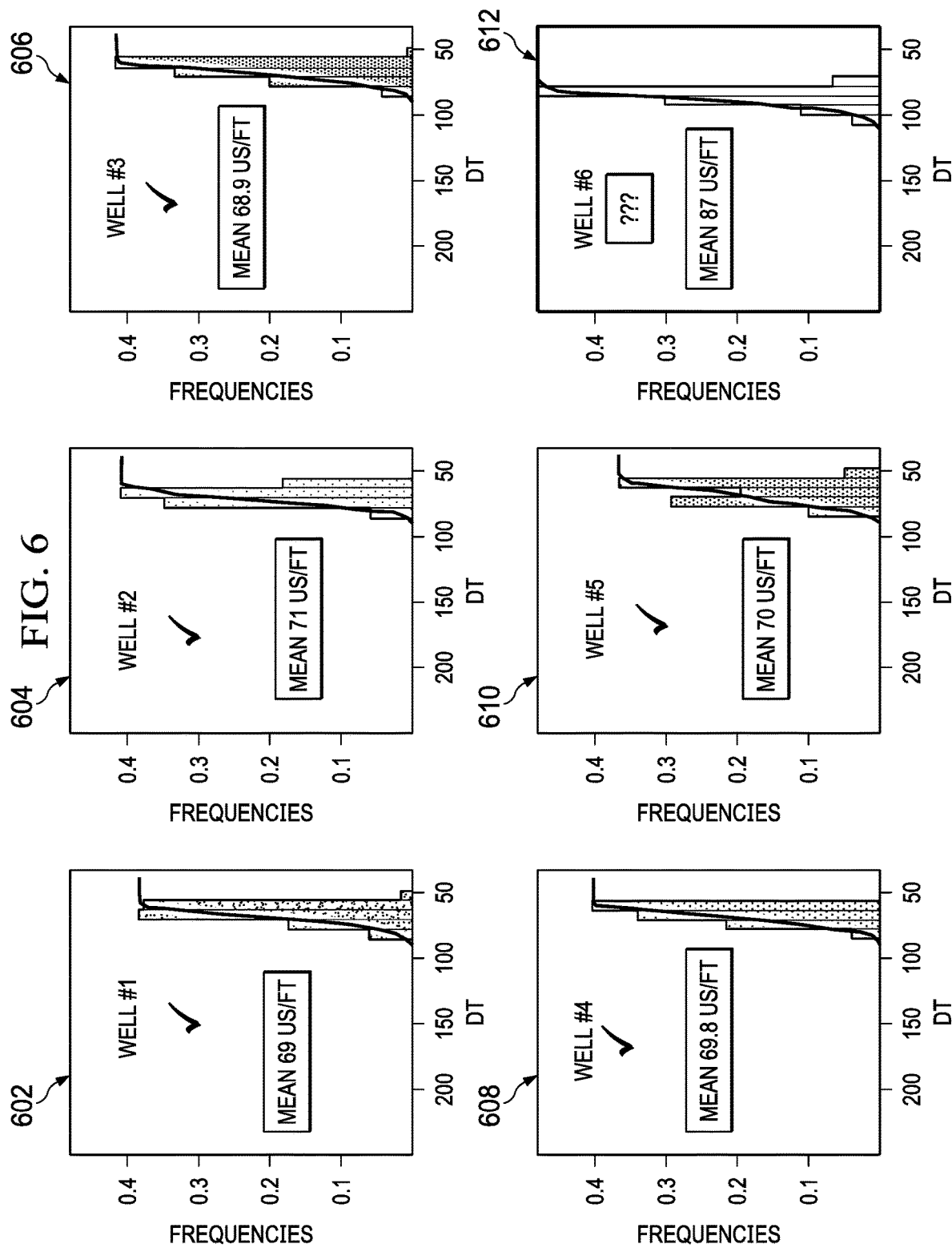
FIG. 6 shows histograms for DT-P data for six different non-key wells, according to some implementations of the present disclosure.

FIG. 6 shows histograms 602, 604, 606, 608, 610, and 612 for DT-P data for six different non-key wells. The system is configured for the calibration of the non-key wells. For example, the mean value from each individual non-key well can be compared to the benchmark value described in relation to FIG. 5. The system is configured to flag any outlier. For example, as shown in FIG. 6, if the value for DT-P was 69.96+/−1.5 μs/ft., and if this DT-P interval is compared to the different values for DT-P for the different non-key wells, all of the values fall within the range except for the non-key well associated with histogram 612 representing well 6, where the DT-P value is 87 μs/ft. By using the example method presented in FIG. 1, the LQC process for a group of wells may be accomplish in less time compared to conventional approaches and with less data, such as without well marker data and without petrophysical analyses.

Figure 7A:
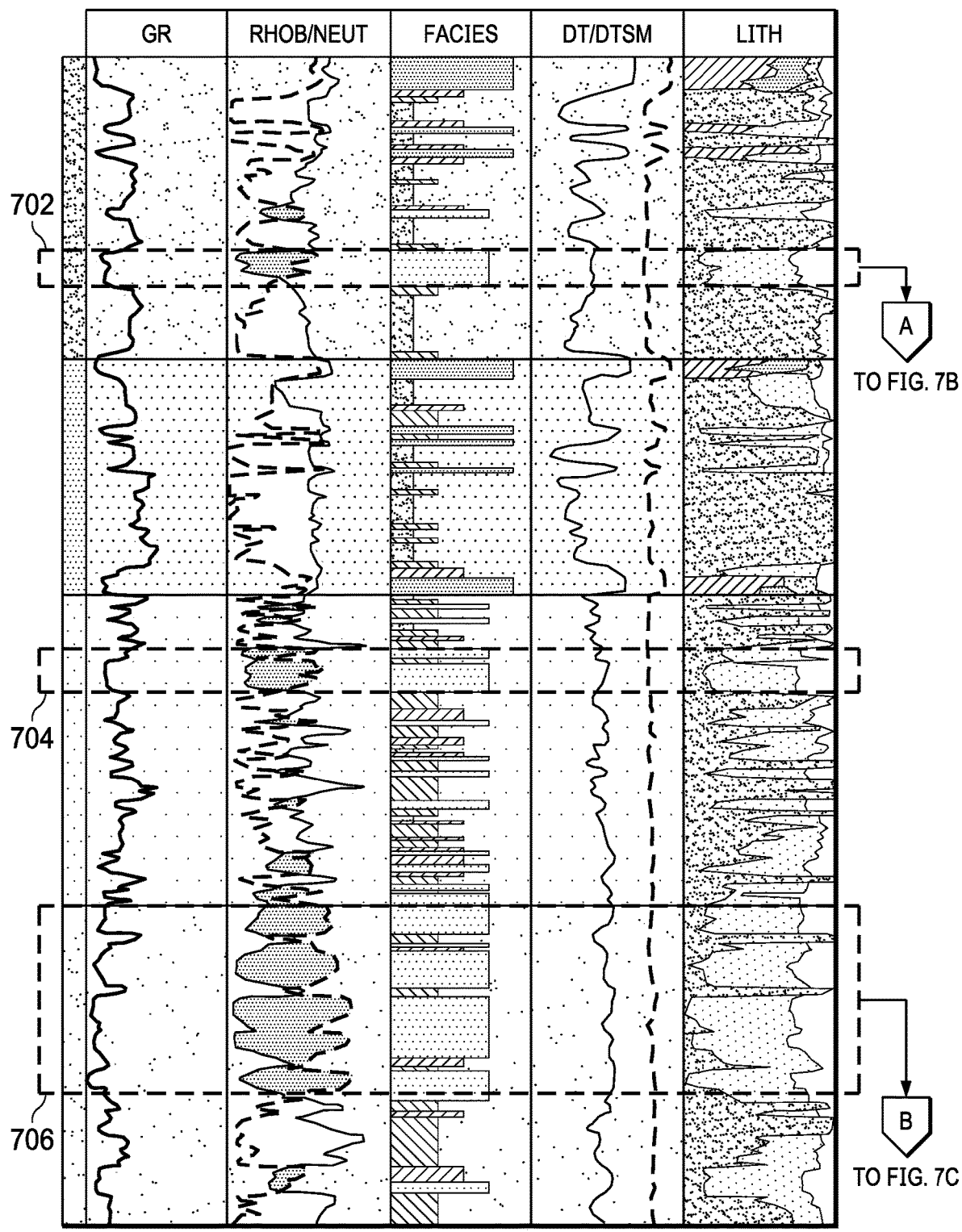
Figure 8D:
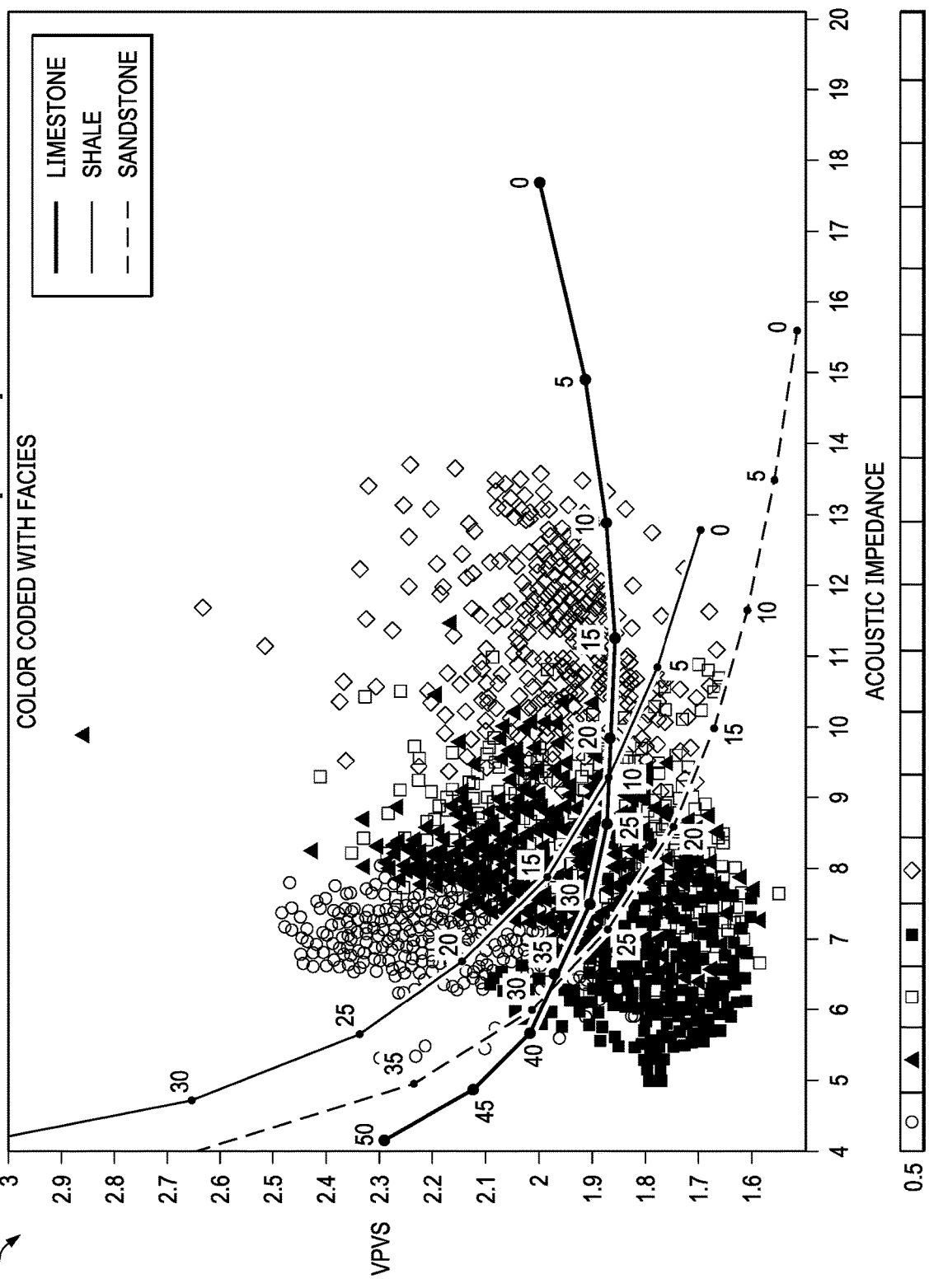

FIGS. 7A-7C show a final predicted facies for a key well in a study area. The rectangles 702, 704, and 706 on the well logs represent gas stringers. A density-neutron cross-plot in FIG. 7B and a Vp/Vs ratio versus AI cross-plot in FIG. 7C are also shown. The cross-plots shows a cluster of points identified by ellipses 708 and 710, respectively, associated with the gas stringers. Multi-well cross-plots with different attributes may alert a user to pay attention while conditioning or de-spiking logs over gas zones. This is just one example to show the additional benefits of the described systems and methods.

FIGS. 8A-8D show the Vp/Vs ratio versus AI cross-plots color coded with different attributes, shown in graphs 802, 804, 806, and 808, respectively. The system validates the predicted facies for the non-key wells.

Figure 9:
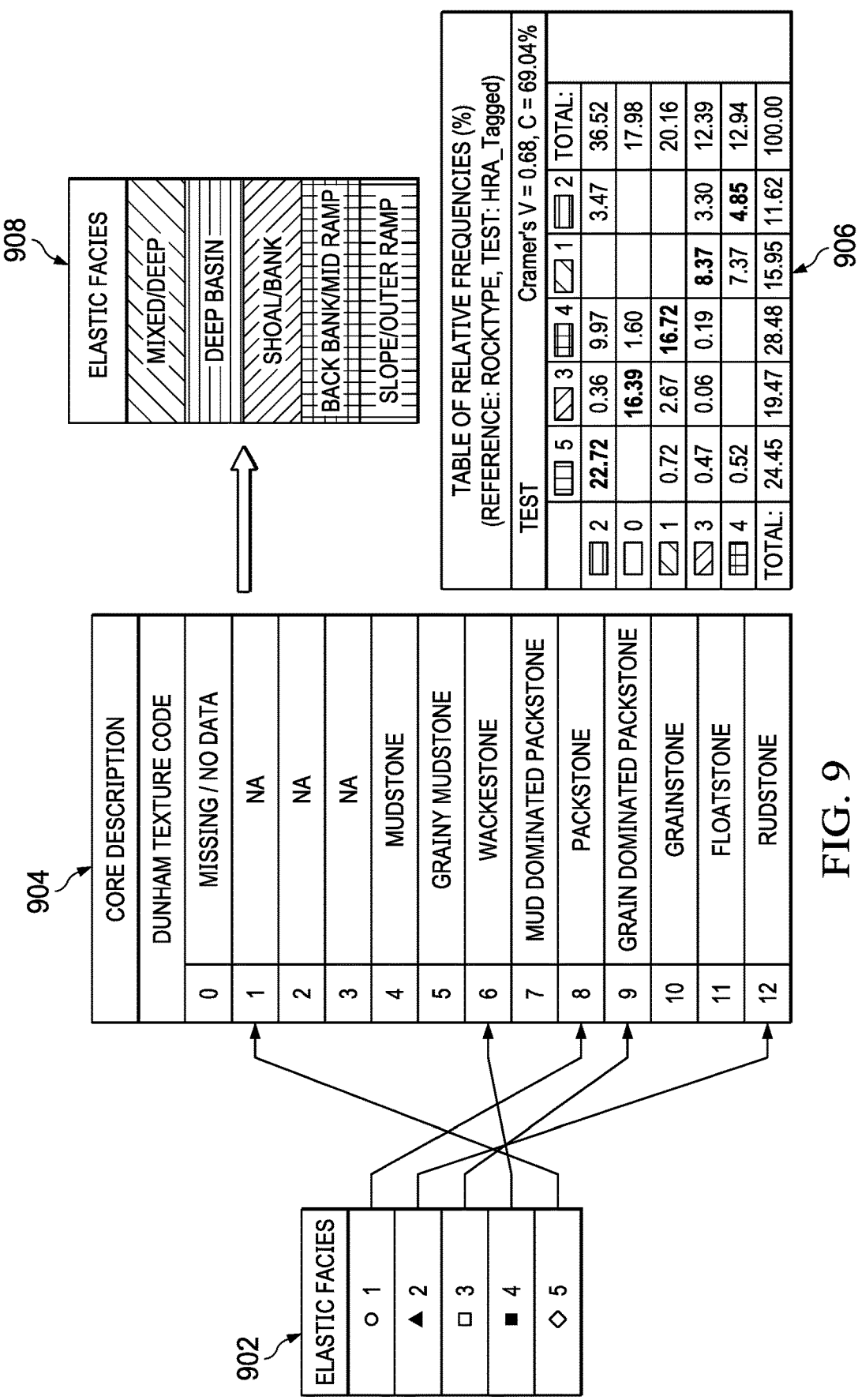
FIG. 9 shows facies association and the calibration of predicted facies with core facies, according to some implementations of the present disclosure.

FIG. 9 shows facies association and the calibration of predicted facies with core facies. Once the facies are calibrated, these facies may be used with inverted seismic data for prospects generation. For example, in FIG. 9, the labeled elastic facies 902 are each associated with a core description 904. Table 906 shows an example of relative frequencies (%) for each reference rock type. The predicted elastic facies 908 when calibrated with core facies, can be used with inverted seismic data as a guiding tool for prospects generation to make informed decisions.

The present disclosure reduces or eliminates inconsistencies in the LQC process and calibrations of non-key well data by providing an accurate and consistent approach. The present disclosure eliminates the need for well markers or petrophysical analyses for non-key wells in order to accomplish the LQC process. The present disclosure reduces the time required to perform an LQC process for a large collection of wells associated with a project with tight deadlines, such as mega projects that may encompass hundreds or thousands of wells. The present disclosure provides an accurate and consistent approach to calibrate logs across a field, enabling the generation high quality log data for rock physics and seismic inversion studies. The marker data and the petrophysical analysis usually not available for all wells at the time of LQC.

Figure 10:
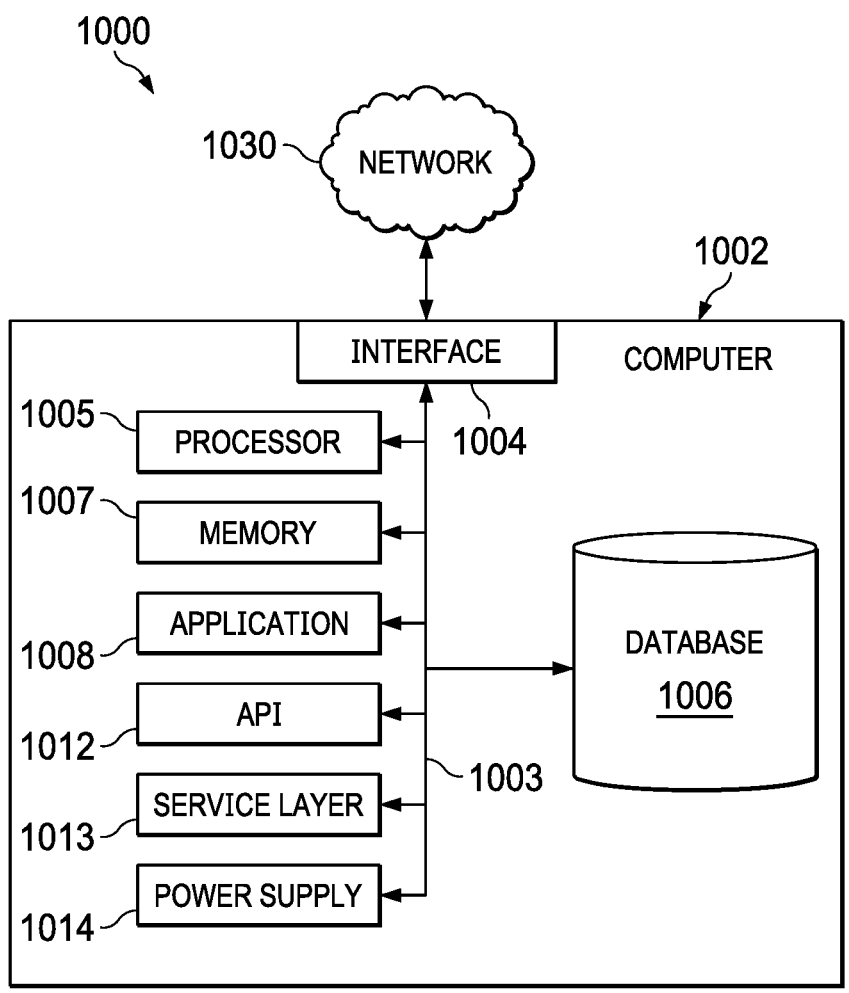
FIG. 10 is a block diagram illustrating an example computer system used to provide computational functionalities associated with described algorithms, methods, functions, processes, flows, and procedures as described in the present disclosure, according to some implementations of the present disclosure.

FIG. 10 is a block diagram of an example computer system 1000 used to provide computational functionalities associated with described algorithms, methods, functions, processes, flows, and procedures described in the present disclosure, according to some implementations of the present disclosure. The illustrated computer 1002 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1002 can include input devices such as keypads, keyboards, and touch screens that can accept user information. Also, the computer 1002 can include output devices that can convey information associated with the operation of the computer 1002. The information can include digital data, visual data, audio information, or a combination of information. The information can be presented in a graphical user interface (UI) (or GUI).

The computer 1002 can serve in a role as a client, a network component, a server, a database, a persistency, or components of a computer system for performing the subject matter described in the present disclosure. The illustrated computer 1002 is communicably coupled with a network 1030. In some implementations, one or more components of the computer 1002 can be configured to operate within different environments, including cloud-computing-based environments, local environments, global environments, and combinations of environments.

At a high level, the computer 1002 is an electronic computing device operable to receive, transmit, process, store, and manage data and information associated with the described subject matter. According to some implementations, the computer 1002 can also include, or be communicably coupled with, an application server, an email server, a web server, a caching server, a streaming data server, or a combination of servers.

The computer 1002 can receive requests over network 1030 from a client application (for example, executing on another computer 1002). The computer 1002 can respond to the received requests by processing the received requests using software applications. Requests can also be sent to the computer 1002 from internal users (for example, from a command console), external (or third) parties, automated applications, entities, individuals, systems, and computers.

Each of the components of the computer 1002 can communicate using a system bus 1003. In some implementations, any or all of the components of the computer 1002, including hardware or software components, can interface with each other or the interface 1004 (or a combination of both), over the system bus 1003. Interfaces can use an application programming interface (API) 1012, a service layer 1013, or a combination of the API 1012 and service layer 1013. The API 1012 can include specifications for routines, data structures, and object classes. The API 1012 can be either computer-language independent or dependent. The API 1012 can refer to a complete interface, a single function, or a set of APIs.

The service layer 1013 can provide software services to the computer 1002 and other components (whether illustrated or not) that are communicably coupled to the computer 1002. The functionality of the computer 1002 can be accessible for all service consumers using this service layer. Software services, such as those provided by the service layer 1013, can provide reusable, defined functionalities through a defined interface. For example, the interface can be software written in JAVA, C++, or a language providing data in extensible markup language (XML) format. While illustrated as an integrated component of the computer 1002, in alternative implementations, the API 1012 or the service layer 1013 can be stand-alone components in relation to other components of the computer 1002 and other components communicably coupled to the computer 1002. Moreover, any or all parts of the API 1012 or the service layer 1013 can be implemented as child or sub-modules of another software module, enterprise application, or hardware module without departing from the scope of the present disclosure.

The computer 1002 includes an interface 1004. Although illustrated as a single interface 1004 in FIG. 10, two or more interfaces 1004 can be used according to particular needs, desires, or particular implementations of the computer 1002 and the described functionality. The interface 1004 can be used by the computer 1002 for communicating with other systems that are connected to the network 1030 (whether illustrated or not) in a distributed environment. Generally, the interface 1004 can include, or be implemented using, logic encoded in software or hardware (or a combination of software and hardware) operable to communicate with the network 1030. More specifically, the interface 1004 can include software supporting one or more communication protocols associated with communications. As such, the network 1030 or the interface's hardware can be operable to communicate physical signals within and outside of the illustrated computer 1002.

The computer 1002 includes a processor 1005. Although illustrated as a single processor 1005 in FIG. 10, two or more processors 1005 can be used according to particular needs, desires, or particular implementations of the computer 1002 and the described functionality. Generally, the processor 1005 can execute instructions and can manipulate data to perform the operations of the computer 1002, including operations using algorithms, methods, functions, processes, flows, and procedures as described in the present disclosure.

The computer 1002 also includes a database 1006 that can hold data for the computer 1002 and other components connected to the network 1030 (whether illustrated or not). For example, database 1006 can be an in-memory, conventional, or a database storing data consistent with the present disclosure. In some implementations, database 1006 can be a combination of two or more different database types (for example, hybrid in-memory and conventional databases) according to particular needs, desires, or particular implementations of the computer 1002 and the described functionality. Although illustrated as a single database 1006 in FIG. 10, two or more databases (of the same, different, or combination of types) can be used according to particular needs, desires, or particular implementations of the computer 1002 and the described functionality. While database 1006 is illustrated as an internal component of the computer 1002, in alternative implementations, database 1006 can be external to the computer 1002.

The computer 1002 also includes a memory 1007 that can hold data for the computer 1002 or a combination of components connected to the network 1030 (whether illustrated or not). Memory 1007 can store any data consistent with the present disclosure. In some implementations, memory 1007 can be a combination of two or more different types of memory (for example, a combination of semiconductor and magnetic storage) according to particular needs, desires, or particular implementations of the computer 1002 and the described functionality. Although illustrated as a single memory 1007 in FIG. 10, two or more memories 1007 (of the same, different, or combination of types) can be used according to particular needs, desires, or particular implementations of the computer 1002 and the described functionality. While memory 1007 is illustrated as an internal component of the computer 1002, in alternative implementations, memory 1007 can be external to the computer 1002.

The application 1008 can be an algorithmic software engine providing functionality according to particular needs, desires, or particular implementations of the computer 1002 and the described functionality. For example, application 1008 can serve as one or more components, modules, or applications. Further, although illustrated as a single application 1008, the application 1008 can be implemented as multiple applications 1008 on the computer 1002. In addition, although illustrated as internal to the computer 1002, in alternative implementations, the application 1008 can be external to the computer 1002.

The computer 1002 can also include a power supply 1014. The power supply 1014 can include a rechargeable or non-rechargeable battery that can be configured to be either user- or non-user-replaceable. In some implementations, the power supply 1014 can include power-conversion and management circuits, including recharging, standby, and power management functionalities. In some implementations, the power-supply 1014 can include a power plug to allow the computer 1002 to be plugged into a wall socket or a power source to, for example, power the computer 1002 or recharge a rechargeable battery.

There can be any number of computers 1002 associated with, or external to, a computer system containing computer 1002, with each computer 1002 communicating over network 1030. Further, the terms "client," "user," and other appropriate terminology can be used interchangeably, as appropriate, without departing from the scope of the present disclosure. Moreover, the present disclosure contemplates that many users can use one computer 1002 and one user can use multiple computers 1002.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/nonvolatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks. Computer readable media can also include magneto optical disks and optical memory devices and technologies including, for example, digital video disc (DVD), CD ROM, DVD+/-R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of the present disclosure have been described. Nevertheless, it will be understood that various modifications may be made without departing from the spirit and scope of the present disclosure. Accordingly, other embodiments are within the scope of the following claims.

What is claimed is:

1. A method of identifying elastic facies in non-key wells as part of Log Quality Control (LQC) comprising:
    identifying a data quality of well data associated with each of a plurality of wells in a region having a geological framework;
    selecting one or more key wells from the plurality of wells, the selected one or more key wells being associated with higher quality well data relative to lower quality well data associated with one or more non-key wells of the plurality of wells in the region;
    building a reference model of elastic facies using the higher quality well data of the selected one or more key wells, the reference model identifying each of the elastic facies, wherein building the reference model comprises determining expected ranges of values, for spectra data, that represent each of the elastic facies of the geological framework;
    propagating the reference model to the lower quality well data of the one or more non-key wells of the plurality of wells in the region by:
        benchmarking the lower quality well data of the one or more non-key wells with the reference model, wherein benchmarking comprises determining, for each of the elastic facies of the reference model, whether spectra data of the lower quality well data are within the expected ranges of values specified by the reference model and based on the geological framework of the plurality of wells in the region;
        calibrating, based on the benchmarking, the lower quality well data of the one or more non-key wells with the reference model by flagging outlier data without use of well markers or petrophysical analysis of the one or more non-key wells, the outlier data not being associated with any of the identified facies of the reference model;
        predicting, based on the calibrating, for the one or more non-key wells, the values for spectra data that are missing in the lower quality well data; and
        estimating, based on the predicted values for the spectra data for the lower quality well data and the reference model of the higher quality well data, a presence of hydrocarbons at or near the one or more non-key wells of the plurality of wells in the region.

2. The method of claim 1, wherein building the reference model comprises performing a principal Component Analysis (PCA) on the higher quality well data of the selected one or more key wells.

3. The method of claim 1, wherein the one or more key wells are selected according to one or more of: a level of penetration of the higher quality well data, a period of time in which the higher quality well data are captured, a resolution of the higher quality well data, a reservoir coverage of the higher quality well data, and an areal coverage representing lithological variations within a well being represented by the higher quality well data.

4. The method of claim 1, wherein building the reference model comprises predicting the elastic facies of a key well.

5. The method of claim 4, further comprising:
validating the predicted elastic facies of the key well using a plurality of cross-plots, each cross-plot including different elastic attributes from other cross-plots of the plurality of cross-plots.

6. The method of claim 4, wherein each of the elastic facies of the key well is represented by a data cluster from a critical path analysis (CPA), and wherein the CPA is further configured to provide, for each of the elastic facies, a mean value of each input data type corresponding to each of the elastic facies to distinguish each of the elastic facies from other elastic facies.

7. The method of claim 1, comprising, in response to calibrating the lower quality well data of the one or more non-key wells with the reference model, generating an alert when a value of the lower quality well data of a non-key well is outside of a range of values indicated by the reference model.

8. A system for identifying elastic facies in non-key wells as part of Log Quality Control (LQC) comprises:
a memory for storing one or more instructions;
one or more processing devices in communication with the memory and configured to execute the one or more instructions to perform operations comprising:
identifying a data quality of well data associated with each of a plurality of wells in a region having a geological framework;
selecting one or more key wells from the plurality of wells, the selected one or more key wells being associated with higher quality well data relative to lower quality well data associated with one or more non-key wells of the plurality of wells in the region;
building a reference model of elastic facies using the higher quality well data of the selected one or more key wells, the reference model identifying each of the elastic facies, wherein building the reference model comprises determining expected ranges of values, for spectra data, that represent each of the elastic facies of the geological framework;
propagating the reference model to the lower quality well data of the one or more non-key wells of the plurality of wells in the region by:
benchmarking the lower quality well data of the one or more non-key wells with the reference model, wherein benchmarking comprises determining, for each of the elastic facies of the reference model, whether spectra data of the lower quality well data are within the expected ranges of values specified by the reference model and based on the geological framework of the plurality of wells in the region;
calibrating, based on the benchmarking, the lower quality well data of the one or more non-key wells with the reference model by flagging outlier data without use of well markers or petrophysical analysis of the one or more non-key wells, the outlier data not being associated with any of the identified facies of the reference model;
predicting, based on the calibrating, for the one or more non-key wells, the values for spectra data that are missing in the lower quality well data; and
estimating, based on the predicted values for the spectra data for the lower quality well data and the reference model of the higher quality well data, a presence of hydrocarbons at or near the one or more non-key wells of the plurality of wells in the region.

9. The system of claim 8, wherein building the reference model comprises performing a principal Component Analysis (PCA) on the higher quality well data of the selected one or more key wells.

10. The system of claim 8, wherein the one or more key wells are selected according to one or more of: a level of penetration of the higher quality well data, a period of time in which the higher quality well data are captured, a resolution of the higher quality well data, a reservoir coverage of the higher quality well data, and an areal coverage representing lithological variations within a well being represented by the higher quality well data.

11. The system of claim 8, wherein building the reference model comprises predicting the elastic facies of a key well.

12. The system of claim 11, wherein the operations further comprise:
validating the predicted elastic facies of the key well using a plurality of cross-plots, each cross-plot including different elastic attributes from other cross-plots of the plurality of cross-plots.

13. The system of claim 11, wherein each of the elastic facies of the key well is represented by a data cluster from a critical path analysis (CPA), and wherein the CPA is further configured to provide, for each of the elastic facies, a mean value of each input data type corresponding to each-of the elastic facies to distinguish each-of the elastic facies from other elastic facies.

14. The system of claim 8, wherein the operations further comprise:
generating, in response to calibrating the lower quality well data of the one or more non-key wells with the reference model, an alert when a value of the lower quality well data of a non-key well is outside of a range of values indicated by the reference model.

15. One or more non-transitory computer readable media storing instructions that are executable by one or more processors configured to perform operations for identifying elastic facies in non-key wells as part of Log Quality Control (LQC), the operations comprising:
identifying a data quality of well data associated with each of a plurality of wells in a region having a geological framework;
selecting one or more key wells from the plurality of wells, the selected one or more key wells being associated with higher quality well data relative to lower quality well data associated with one or more non-key wells of the plurality of wells in the region;
building a reference model of elastic facies using the higher quality well data of the selected one or more key wells, the reference model identifying each of the elastic facies, wherein building the reference model comprises determining expected ranges of values, for spectra data, that represent each of the elastic facies of the geological framework;
propagating the reference model to the lower quality well data of the one or more non-key wells of the plurality of wells in the region by:
benchmarking the lower quality well data of the one or more non-key wells with the reference model, wherein benchmarking comprises determining, for each of the elastic facies of the reference model, whether spectra data of the lower quality well data are within the expected ranges of values specified by the reference model and based on the geological framework of the plurality of wells in the region;
calibrating, based on the benchmarking, the lower quality well data of the one or more non-key wells with the reference model by flagging outlier data without use of well markers or petrophysical analysis of the one or more non-key wells, the outlier data not being associated with any of the identified facies of the reference model;

predicting, based on the calibrating, for the one or more non-key wells, the values for spectra data that are missing in the lower quality well data; and estimating, based on the predicted values for the spectra data for the lower quality well data and the reference model of the higher quality well data, a presence of hydrocarbons at or near the one or more non-key wells of the plurality of wells in the region.

16. The one or more non-transitory computer readable media of claim 15, wherein building the reference model comprises performing a principal Component Analysis (PCA) on the higher quality well data of the selected one or more key wells.

17. The one or more non-transitory computer readable media of claim 15, wherein the one or more key wells are selected according to one or more of: a level of penetration of the higher quality well data, a period of time in which the higher quality well data are captured, a resolution of the higher quality well data, a reservoir coverage of the higher quality well data, and an areal coverage representing lithological variations within a well being represented by the higher quality well data.

18. The one or more non-transitory computer readable media of claim 15, wherein building the reference model comprises predicting the elastic facies of a key well.

19. The one or more non-transitory computer readable media of claim 18, further comprising:

validating the predicted elastic facies of the key well using a plurality of cross-plots, each cross-plot including different elastic attributes from other cross-plots of the plurality of cross-plots.

20. The one or more non-transitory computer readable media of claim 18, wherein each of the elastic facies of the key well is represented by a data cluster from a critical path analysis (CPA), and wherein the CPA is further configured to provide, for each of the elastic facies, a mean value of each input data type corresponding to each of the elastic facies to distinguish each of the elastic facies from other elastic facies.

* * * * *

UNITED STATES PATENT AND TRADEMARK OFFICE
CERTIFICATE OF CORRECTION

PATENT NO. : 11,867,861 B2
APPLICATION NO. : 16/809095
DATED : January 9, 2024
INVENTOR(S) : Muhammad Ashfaq It is certified that error appears in the above-identified patent and that said Letters Patent is hereby corrected as shown below:

In the Claims

Column 18, Line 25, Claim 13, please replace "each-of" with -- each of --.

Column 18, Line 26, Claim 13, please replace "each-of" with -- each of --.

Signed and Sealed this
Twenty-second Day of October, 2024

*Katherine Kelly Vidal*

Katherine Kelly Vidal
*Director of the United States Patent and Trademark Office*